US 6,677,551 B2

(12) United States Patent
Hardwick

(10) Patent No.: US 6,677,551 B2
(45) Date of Patent: Jan. 13, 2004

(54) PROCESS FOR OPERATING A PLASMA ARC TORCH

(75) Inventor: Steven F. Hardwick, John's Island, SC (US)

(73) Assignee: InnerLogic, Inc., Charleston, SC (US)

( * ) Notice: Subject to any disclaimer, the term of this patent is extended or adjusted under 35 U.S.C. 154(b) by 0 days.

(21) Appl. No.: 10/200,865

(22) Filed: Jul. 23, 2002

(65) Prior Publication Data
US 2002/0185477 A1 Dec. 12, 2002

Related U.S. Application Data

(63) Continuation of application No. 09/824,177, filed on Apr. 1, 2001, now Pat. No. 6,498,317, which is a continuation-in-part of application No. 09/540,077, filed on Mar. 31, 2000, now Pat. No. 6,336,583, which is a continuation-in-part of application No. 09/416,304, filed on Oct. 12, 1999, now Pat. No. 6,093,905, and a continuation-in-part of application No. 09/178,206, filed on Oct. 23, 1998, now Pat. No. 6,163,009.

(51) Int. Cl.[7] .............................................. B23K 10/00
(52) U.S. Cl. ..................... 219/121.54; 219/121.57; 219/121.52; 219/121.38; 219/121.55
(58) Field of Search ..................... 219/121.39, 121.38, 219/121.59, 121.52, 121.54, 121.57, 121.44, 121.55

(56) References Cited

U.S. PATENT DOCUMENTS 2,906,858 A 9/1959 Morton, Jr.
3,082,314 A 3/1963 Arata et al.
3,131,288 A 4/1964 Browning
3,204,076 A 8/1965 Browning
3,242,305 A 3/1966 Kane et al.
3,272,962 A 9/1966 Mauskapf
3,373,306 A 3/1968 Karlovitz
3,403,211 A 9/1968 Foex
3,476,906 A 11/1969 Rovan
3,534,388 A 10/1970 Takakiyo et al.
3,536,885 A 10/1970 Sunnen et al.
3,567,898 A 3/1971 Fein (List continued on next page.)

FOREIGN PATENT DOCUMENTS

FR 2135469 12/1972
JP 5082357 3/1975

(List continued on next page.)

Primary Examiner—Mark Paschall
(74) Attorney, Agent, or Firm—Dority & Manning, P.A.

(57) ABSTRACT

A process for operating a plasma torch having an improved start up and shut down sequence to substantially increase electrode element life. The first shut down mode is controlled such that plasma gas flow through the swirl ring and nozzle prevents the formation of an oxide layer upon the electrode. The shut down method is especially useful for torches which operate at 100 amps or greater. The inclusion of an aluminum jacket surrounding the electrode outer walls has been found to contribute to the ability to avoid formation of oxide layers on the electrode.

17 Claims, 3 Drawing Sheets

U.S. PATENT DOCUMENTS

| | | | |
|---|---|---|---|
| 3,575,568 A | | 4/1971 | Tateno |
| 3,588,594 A | | 6/1971 | Yamamoto et al. |
| 3,601,578 A | | 8/1971 | Gebel et al. |
| 3,619,549 A | | 11/1971 | Hogan et al. |
| 3,641,308 A | | 2/1972 | Couch, Jr. et al. |
| 3,643,580 A | | 2/1972 | Siegel |
| 3,644,782 A | | 2/1972 | Sheer et al. |
| 3,770,935 A | | 11/1973 | Tateno et al. |
| 3,787,247 A | * | 1/1974 | Couch, Jr. |
| 3,833,787 A | * | 10/1975 | Muehlberger |
| 3,930,139 A | | 12/1975 | Bykhovsky et al. |
| 3,949,188 A | * | 4/1976 | Tateno |
| 3,988,566 A | * | 10/1976 | Vogts et al. |
| 4,029,930 A | * | 6/1977 | Sagara et al. |
| 4,060,088 A | * | 11/1977 | Morrison, Jr. et al. |
| 4,133,987 A | * | 1/1979 | Lakomsky et al. |
| 4,163,891 A | * | 8/1979 | Komatsu et al. |
| 4,174,477 A | * | 11/1979 | Essers et al. |
| 4,175,225 A | | 11/1979 | Holko et al. |
| 4,195,216 A | * | 3/1980 | Beauchamp et al. |
| 4,203,022 A | * | 5/1980 | Couch, Jr. et al. |
| 4,275,287 A | | 6/1981 | Hiratake |
| 4,282,418 A | | 8/1981 | Wuestner |
| 4,291,217 A | * | 9/1981 | Braun |
| 4,341,941 A | * | 7/1982 | Tateno |
| 4,361,748 A | * | 11/1982 | Couch, Jr. |
| 4,382,170 A | * | 5/1983 | Klingel |
| 4,389,559 A | * | 6/1983 | Rotolico et al. |
| 4,410,788 A | * | 10/1983 | Summers et al. |
| 4,421,970 A | * | 12/1983 | Couch, Jr. |
| 4,506,136 A | * | 3/1985 | Smyth et al. |
| 4,521,666 A | * | 6/1985 | Severance, Jr. et al. |
| 4,567,346 A | * | 1/1986 | Marhic |
| 4,625,094 A | * | 11/1986 | Marhic et al. |
| 4,645,899 A | * | 2/1987 | Browning |
| 4,647,082 A | * | 3/1987 | Fournier et al. |
| 4,663,512 A | * | 5/1987 | Kneeland et al. |
| 4,692,582 A | * | 9/1987 | Marhic |
| 4,701,590 A | * | 10/1987 | Hatch |
| 4,743,734 A | * | 5/1988 | Garlanov et al. |
| 4,748,312 A | * | 5/1988 | Hatch et al. |
| 4,762,977 A | * | 8/1988 | Browning |
| 4,764,656 A | * | 8/1988 | Browning |
| 4,782,210 A | * | 11/1988 | Nelson et al. |
| 4,791,268 A | * | 12/1988 | Sanders et al. |
| 4,861,962 A | * | 8/1989 | Sanders et al. |
| 4,866,240 A | * | 9/1989 | Webber |
| 4,882,465 A | * | 11/1989 | Smith et al. |
| 4,902,871 A | | 2/1990 | Sanders et al. |
| 4,909,914 A | | 3/1990 | Chiba et al. |
| 4,918,283 A | | 4/1990 | Yamade et al. |
| 5,013,885 A | | 5/1991 | Carkhuff et al. |
| 5,017,752 A | | 5/1991 | Severance, Jr. et al. |
| 5,023,425 A | | 6/1991 | Severance, Jr. |
| 5,070,227 A | | 12/1991 | Luo et al. ................. 1991/121 |
| 5,089,221 A | | 2/1992 | Johansson et al. |
| 5,105,061 A | | 4/1992 | Blankenship |
| 5,120,930 A | | 6/1992 | Sanders et al. |
| 5,132,512 A | | 7/1992 | Sanders et al. |
| 5,164,568 A | | 11/1992 | Sanders |
| 5,166,494 A | | 11/1992 | Luo et al. |
| 5,170,033 A | | 12/1992 | Couch, Jr. et al. |
| 5,235,162 A | | 8/1993 | Nourbakhsh |
| 5,290,995 A | | 3/1994 | Higgins et al. |
| 5,317,126 A | | 5/1994 | Couch, Jr. et al. |
| 5,393,952 A | | 2/1995 | Yamaguchi et al. |
| 5,396,043 A | | 3/1995 | Couch, Jr. et al. |
| 5,414,237 A | | 5/1995 | Carkhuff |
| 5,424,507 A | | 6/1995 | Yamaguchi |
| 5,468,026 A | | 11/1995 | Annestedt |
| 5,473,140 A | | 12/1995 | Colling |
| 5,506,384 A | | 4/1996 | Yamaguchi |
| 5,548,097 A | | 8/1996 | Couch, Jr et al. |
| 5,591,357 A | | 1/1997 | Couch, Jr. et al. |
| 5,624,586 A | | 4/1997 | Sobr et al. |
| 5,653,895 A | | 8/1997 | Shintani |
| 5,695,662 A | | 12/1997 | Couch, Jr. et al. |
| 5,734,144 A | | 3/1998 | Yamaguchi et al. |
| 5,841,095 A | | 11/1998 | Lu et al. |
| 6,028,287 A | | 2/2000 | Passage et al. |
| 6,054,669 A | | 4/2000 | Warren, Jr. |
| 6,093,905 A | | 7/2000 | Hardwick et al. |

FOREIGN PATENT DOCUMENTS

| | | |
|---|---|---|
| JP | 50135721 | 11/1975 |
| JP | 5116379 | 5/1976 |
| JP | 5121945 | 7/1976 |
| JP | 5236725 | 3/1977 |
| JP | 5768270 | 4/1982 |
| JP | 57165370 | 10/1982 |
| JP | 58205676 | 11/1983 |
| JP | 59141371 | 8/1984 |
| JP | 6055221 | 12/1985 |
| JP | 6228084 | 2/1987 |
| JP | 5233025 | 7/1987 |
| JP | 6310082 | 1/1988 |
| JP | 63101076 | 5/1988 |
| JP | 63180378 | 7/1988 |
| JP | 6483376 | 3/1989 |
| JP | 55144337 | 4/1991 |
| JP | 5104251 | 4/1993 |
| RU | 274263 | 6/1970 |
| RU | 1234104 | 5/1986 |
| WO | 9102619 | 3/1991 |
| WO | 8900476 | 1/1998 |

* cited by examiner

PROCESS FOR OPERATING A PLASMA ARC TORCH

RELATED APPLICATIONS

This application is a Continuation of U.S. application Ser. No. 09/824,177 filed on Apr. 2, 2001 now U.S. Pat. No. 6,498,317, which is a Continuation-in-Part of U.S. application Ser. No. 09/540,077 filed on Mar. 31, 2000 now U.S. Pat. No. 6,326,583, which is a Continuation-in-Part of application Ser. No. 09/416,304 filed Oct. 12, 1999 and issued as U.S. Pat. No. 6,093,905 and application Ser. No. 09/178,206 filed Oct. 23, 1998 and issued as U.S. Pat. No. 6,163,009 which are incorporated herein by reference in their entirety.

BACKGROUND OF THE INVENTION

The present invention relates generally to a process for operating a plasma arc torch, and more particularly to a start up sequence and a shut down sequence that significantly extends the life of the electrode and nozzle.

The operation of conventional plasma arc torches is well understood by those in the art. The basic components of these torches are a body, an electrode mounted in the body, a nozzle defining an orifice for a plasma arc, a source of ionizable gas, and an electrical supply for producing an arc in the gas. Upon start up, an electrical current is supplied to the electrode (generally a cathode) and the pilot arc is initiated in the ionizable gas typically between the electrode and the nozzle, the nozzle defining an anode. Then, a conductive flow of the ionized gas is generated from the electrode to the work piece, wherein the work piece then defines the anode, and a plasma arc is thus generated from the electrode to the work piece. The ionizable gas can be non-reactive, such as nitrogen, or reactive, such as oxygen or air.

A significant problem with conventional plasma arc torches is wear of the electrodes and nozzles. Typically, the electrodes include a hafnium or a zirconium insert. These materials are desired for their material properties, but are extremely costly and require frequent replacement.

It has been found that a significant percentage of the electrode wear and damage occurs during shut down of the torch. It is believed that on cut off of electrical current to the electrode, wear results from a complicated interaction between molten surfaces of the electrode and the pressurized flow of the plasma gas through the nozzle. The phenomena is also described in U.S. Pat. No. 5,070,227 which is incorporated herein by reference.

One form of electrode wear includes the formation of an oxide such as Hafnium oxide or Zirconium oxide. As set forth in the Applicant's prior U.S. Pat. No. 6,093,905 which is incorporated herein by reference, the oxidation of the electrode is a major contributor to electrode wear and loss. Applicant's prior U.S. patent describes a shut-down protocol for a plasma arc torch which is varied over the life of the electrode so as to beneficially remove accumulated oxide material from the electrode.

It is also understood that the electrodes, and particularly the inserts, have a limited number of cycles or "pierces". A "pierce" refers to the starting up and initial cutting or piercing of the arc through a work piece. For each pierce there is obviously a prior shut down of the torch and an associated start up sequence. Plasma torches utilizing conventional shut down methods and operating above 100 amps have an electrode life of generally between about 400 to 800 pierces.

The industry is constantly seeking methods for improving the plasma torches, and particularly for extending the life and improving the wear characteristics of the electrodes. The present invention concerns just such an improved method.

OBJECTS AND SUMMARY OF THE INVENTION

It is, therefore, a principal object of the present invention to provide a process for operating a plasma arc torch, particularly on shut down, that significantly reduces oxidation formation of the electrode element, and loss of molten element material and thereby reduce electrode element erosion and eliminate nozzle damage.

An additional object of the present invention is to provide a process for shutting down conventional plasma arc torches that can be readily practiced by conventional torches with relatively minor modifications.

Additional objects and advantages of the invention will be set forth in part in the following description, or may be apparent from the description, or may be learned through practice of the invention.

In accordance with the objects and purposes of the invention, a process is provided for operating a plasma arc torch on shut down. The process operates on the principles of substantially reducing the oxidation of the electrode and further eliminating loss of molten electrode material during the shut down sequence in order to substantially increase the life of the electrode. It has been found by Applicants that, through practice of the present invention, electrode life of conventional torches can be extended as much as four-fold.

It is another aspect of the present invention to provide a new and useful start up sequence which controls the gas flow relative to the arc current. Applicant's start up method eliminates nozzle damage, reduces electrode erosion, and maintains a stable arc. The improved start up methodology may use conventional gas supply and control means. The start up method has the additional advantage of reducing damage to torch components caused by molten metal during piercing of the work piece during start up. The start up sequence allows a more rapid penetration through material and thus minimizes molten metal blow back that may otherwise damage the torch frontend components.

The invention will be described in greater detail below through use of the appended figures.

DETAILED DESCRIPTION

Figure 1:
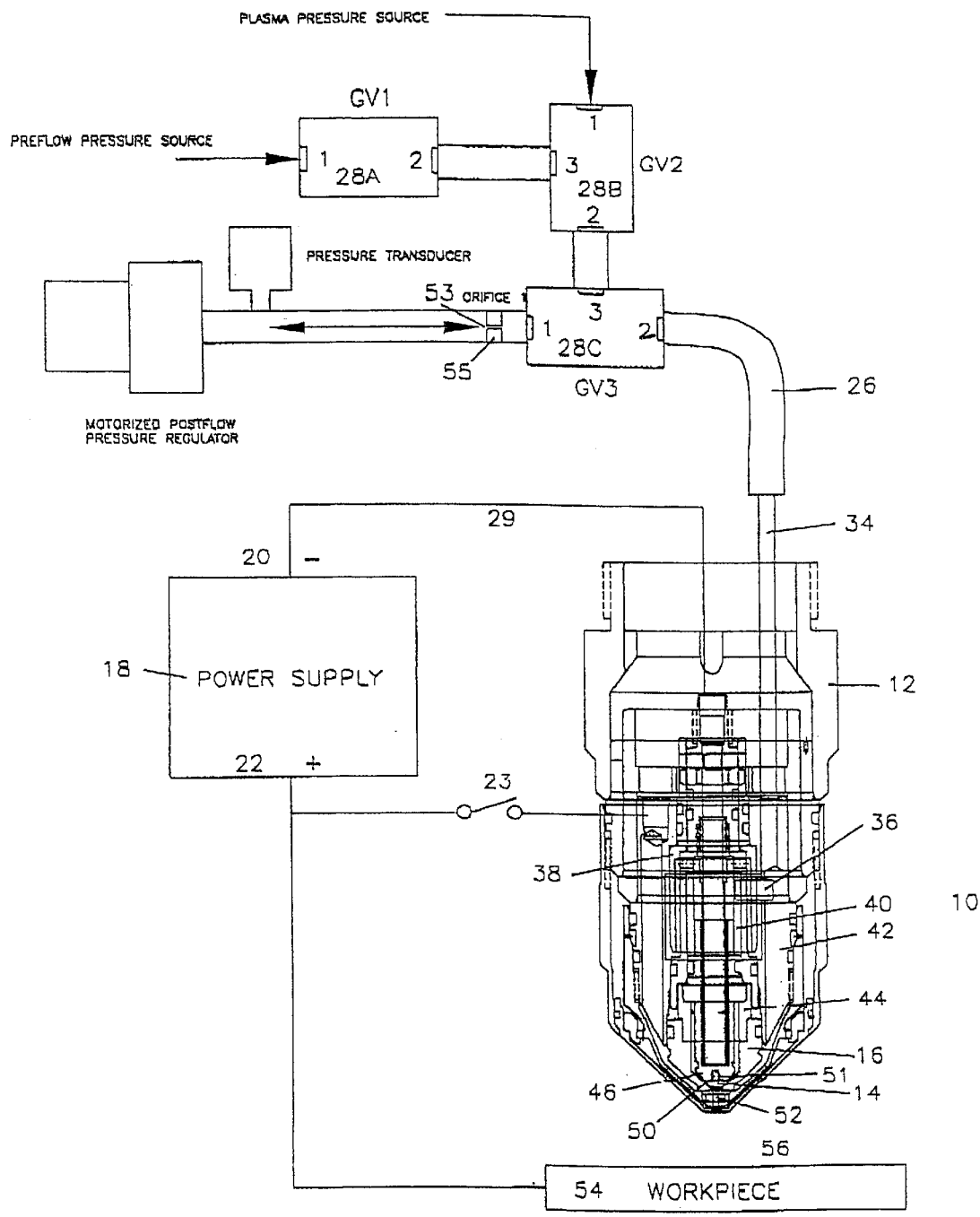
FIG. 1 is a simplified schematic view of a plasma arc torch having the gas supply means and pathway useful for practicing the present invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment, can be used with another embodiment to yield still a further embodiment. It is intended that the present invention include such modifications and variations as come within the scope of the invention.

FIG. 1 is a simplified schematic view of a conventional plasma arc torch, similar to the FL 100 plasma arc torch provided by InnerLogic, Inc. of Charleston, S.C. It should be appreciated, however, that the present inventive method is not limited to any particular type of plasma arc torch. Any manner of conventional torches may be modified by the inclusion of an aluminum sleeve which surrounds the cylindrical walls of the electrode element. When combined with the start up and shut down sequences of the present invention, greater electrode element life and operating efficiencies may be obtained. For example, U.S. Pat. No. 5,070,227 describes a control process applicable to a wide variety of torches, including torches sold by HyperTherm, Inc. of Hanover, N.H. The present control method is applicable to the types of torches described in the '227 patent upon modification of the electrode with the aluminum jacket as described below. The '227 patent is incorporated herein by reference in its entirety for all purposes.

The operation of conventional torches is well understood by those skilled in the art and a detailed explanation thereof is not necessary for purposes of this disclosure. The following description is for background purposes relating to conventional plasma arc torches in general and provides additional details of a torch apparatus and methods of torch start up and shut down in accordance with the present invention.

Referring to FIG. 1, plasma arc torch 10 has a basic body, generally indicated as 12. Body 12 includes a torch supply tube 34 defining a supply chamber 36 that is supplied with a source of pressurized ionizable gas from gas supply 24 through gas supply line 26. Remotely actuated valves, such as solenoid valves 28A, 28B and 28C are disposed in-line between supply tube 34 and gas source 24 to vary the supply of various gases to torch 10 upon actuation of the valve.

As is appreciated by those skilled in the art, the plasma gas may be non-reactive, such as nitrogen, or reactive, such as oxygen or air. Torch body 12 includes an electrode body 46, typically formed from copper. An electrode insert or element 50 is fitted into the lower end of electrode body 46. An aluminum sleeve 51 forms a jacket around the cylindrical walls of element 50. Element 50 is typically formed of hafnium or zirconium, particularly when the plasma gas is a reactive gas.

An insulating body 38 generally surrounds the supply tube 34 and electrode body 46. The cathode body 40 is disposed generally surrounding supply tube 34 and an anode body 42 is disposed surrounding insulating body 38.

A nozzle 16 is disposed at the forward end of electrode body 46 and defines an arc passageway 52 aligned with electrode element 50.

A swirl ring 44 is disposed around the electrode body 46 and has holes defined therein to induce a swirling component to plasma gas entering the plasma gas chamber 14, as will be discussed in greater detail below.

A power supply 18 is provided to supply electrical current to electrode body 46 and the electrode element 50. A negative power lead 29 is in electrical communication with supply tube 24 and cathode body 40. In a pilot arc mode, a positive power lead 22 is in electrical communication with anode body 42 through switch 23. Insulating body 38 electrically isolates anode body 42 from cathode body 40. Positive power lead 22 is also connectable to a work piece 54 that is to be cut or pierced by the plasma torch once switch 23 is opened. Power supply 18 may constitute any conventional dc power supply sufficient to provide current to the torch at an appropriate voltage to initiate the pilot arc and then maintain the arc in the operational cutting mode of the torch.

In operation, plasma gas flows from source 24, through valves 28B and 28C, and enters supply line 26, as generally indicated by the arrows in FIG. 1. The plasma gas flows downward in chamber 36 through orifices in swirl ring 44 before entering the lower plasma gas chamber 14. It should be understood that lower plasma gas chamber 14 is in communication with the entirety of the supply chamber 36 of supply tube 34 so that a change in pressure anywhere within the system will affect a change in pressure within lower plasma gas chamber 14.

In the pilot arc mode of torch 10, switch 23 is closed so that the positive lead is connected to anode body 42. Power supply 20 provides current at the appropriate voltage to initiate the pilot arc between electrode element 50 and nozzle 16. A desired plasma gas flow and pressure are set by the operator for initiating the pilot arc. The pilot arc is started by a spark or other means, such as a contact starting technique, all of which are known in the art.

The plasma gas flow during the pilot arc mode is from supply 24, through valves 28A, 28B and 28C, and through supply line 26 into supply chamber 34, through the holes in swirl ring 44, into lower plasma chamber 14, and out through arc passageway 52 of nozzle 16. The swirling flow generated by swirl ring 44 is desired as a means for stabilizing the arc in all operational modes so that the arc does not impinge on and damage the nozzle.

In order to transfer torch 10 to the cutting mode, the torch is brought close to workpiece 54 so that the arc transfers to the workpiece 54 as switch 23 opens. The transferred arc now passes current from the electrode to workpiece 54. The current is increased to a desired level for cutting such that a plasma arc 56 is generated which extends through arc passageway 52 to workpiece 54. The operational current levels depend on the type of torch and application desired, and typically range from about 20 to about 200 amps. As the operational current is increased, the plasma gas within lower plasma chamber 14 heats up and a decrease in plasma gas flow out of nozzle 16 results. In order to sustain sufficient plasma gas flow through nozzle 16 to sustain the plasma arc 56, pressure of the plasma gas being supplied must be increased with the increase of current.

The start up and shut down processes according to the present invention will now be described in greater detail through use of the diagrams of FIGS. 1–3.

As already described, a critical concern with conventional plasma arc torches is the electrode life, and particularly the life of the hafnium or zirconium inserts. It is known that the start up and shut down process results in severe wear of the electrode elements. The present Applicants have discovered that the electrode life can be substantially lengthened by following an improved start up sequence. Additionally, electrode life can be further lengthened by following an improved shut down sequence which substantially eliminates the oxidation of the electrode during a shut down mode. Further, the shut down protocol minimizes loss of the molten electrode insert material.

Although not wishing to be bound by any particular theory, Applicants believe that at least one of the factors contributing to wear on the electrode elements is the build up of an oxide layer on the element. It has been found in accordance with one aspect of the present invention that the shut down mode of the present invention substantially eliminates the formation of an oxide layer.

On tests conducted on a FL 200 plasma arc torch using a conventional start up sequence and a no post-flow first shut down mode, the electrode life was about 300 to 600 pierces.

The same model torch was tested according to both the start up and shut down method of the present invention. The electrode life was extended to about 1,500 pierces. It is believed that this substantial increase in the electrode life was due to the chemical combination of aluminum, hafnium, and other element materials which may be present during the current reduction (insert cooling) that substantially eliminates oxide formation. Further, the loss of unsolidified electrode element's components which results from the post-flow of gases past the nozzle is further minimized by the present invention.

It should be appreciated by those skilled in the art that the particular number of pierces obtained for any one electrode will depend on the particular type of torch, insert material, current levels, etc. The best combination of materials for any given application may be empirically determined or estimated.

Figure 2:
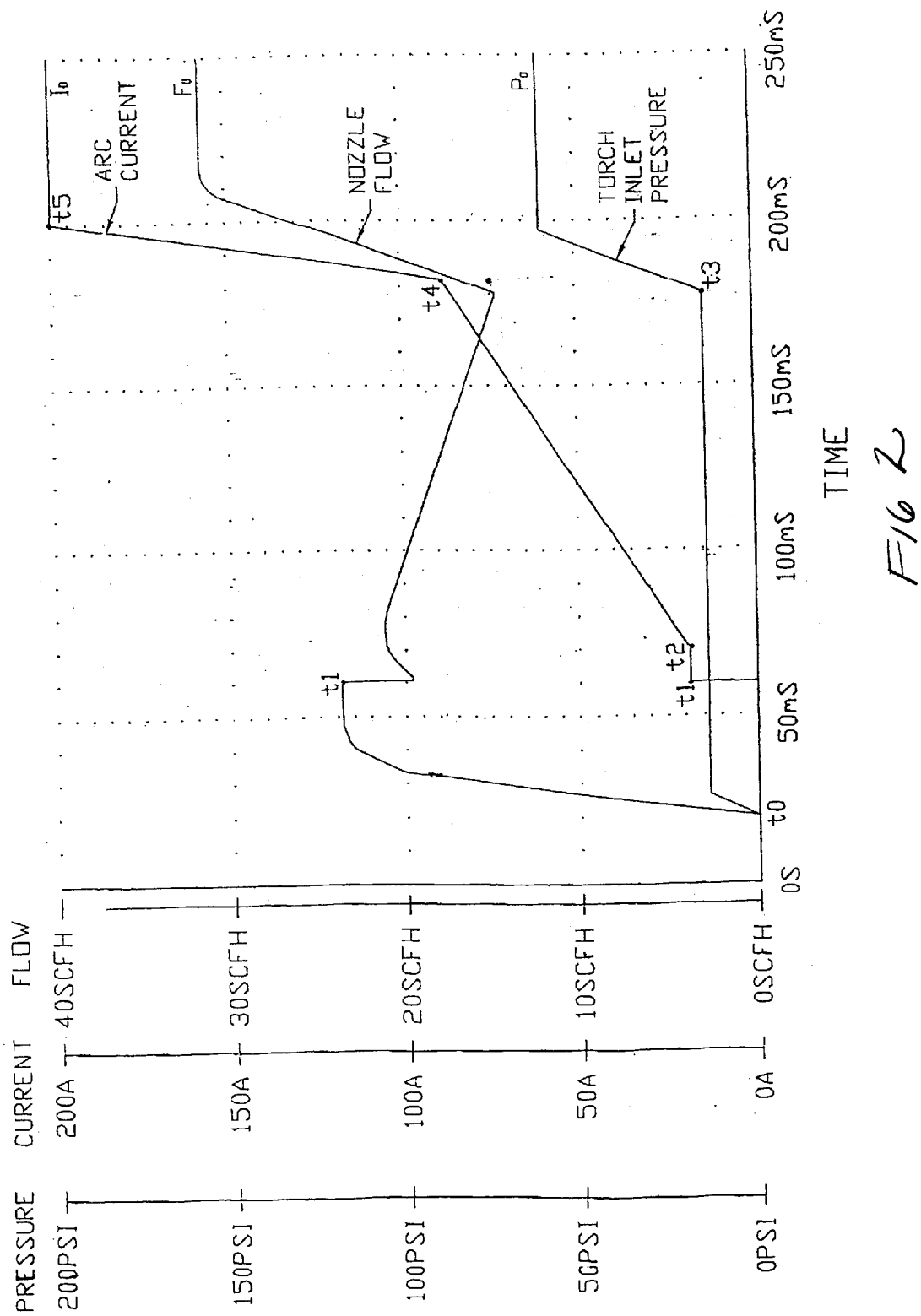
FIG. 2 is a graph illustrating an embodiment of a start up sequence according to the invention; and, FIG. 3 is a graph illustrating an embodiment of a shut down sequence according to the invention.

FIG. 2 represents a conceptual timing phase of one embodiment of a start up sequence according to the invention. The start up of the plasma arc torch involves the interaction of the plasma arc current, the plasma gas flow rate through the nozzle, and the gas pressure of the plasma gas within plasma gas chamber 14, where chamber 14 is defined generally between the swirl ring 44 and the nozzle 16. The left hand side of the graph of FIG. 2 represents a start up sequence of the present invention. The end values on the far right hand side of the graph of FIG. 2 represents the operational steady state values Io, Fo, and Po of the respective current and gas flow parameters.

In reference to FIG. 2, during the start up sequence beginning at t0, a pre-flow pressure source is provided through valve 28A until time t3. At t3, valve 28B is turned on and immediately blocks the pre-flow gas from 28A. At the t3 point, the operating nozzle flow and torch pressure flows are introduced. The present invention introduces an increase in the arc current upslope rate from t4 to t5. The upslope increase coincides with the increase beginning at t3 in the plasma gas flow rate through the nozzle. The increase in the arc current slope rate from t4 to t5, in conjunction with a similar increase in the plasma gas flow rate through the nozzle, has been found to decrease erosion of the electrode during start up. When gas flow is too low relative to the current, nozzle damage may occur to the nozzle components. When gas flow is too high relative to the current, erosion of the electrode is increased.

In the present invention, the arc current is increasing between interval t2 to t5. The rate (slope) of the arc current is further increased at t4. Increasing the arc current is normally associated with a decrease in the nozzle flow as the arc current reduces the nozzle flow. This increase in the upslope rate of the arc current occurs immediately after the introduction at t3 of the operating nozzle flow and torch pressure. The upslope increase in arc current brings about a concomitant decrease in nozzle flow which would otherwise occur, thereby avoiding a nozzle flow gas overshoot. As a result, the current upslope rate increase is timed in conjunction with the interval during which nozzle gas flow and pressure are also rapidly increasing. As the current increases, the rate of nozzle flow increase is regulated, decreasing damage to the electrode element.

In the example set forth in FIG. 2, the value at interval t4 for the arc current is 87 amps at 182 msec. It has been found in accordance with this invention that the sharp increase in arc current slope from t4 to t5 reduces damage to the torch during start up. The improvement relates in part to the reduction in molten metal blowback during the piercing operation. The sharp current increase as reflected in the rate of rise has been found to more quickly penetrate the substrate and minimize damage of the torch components from the molten substrate.

It has additionally been found that the torch electrode life is prolonged by the further use of an improved torch shut down sequence. The shut down sequence makes use of the gas control components as seen and described in reference to FIG. 1. During the steady state operation of the torch, gas control valve 28A is closed stopping the pre-flow gas and commencing plasma gas flow through valves 28B (ports 1 and 2) and 28C (ports 2 and 3) at a pressure of about 65 psi. A shut down sequence is initiated at interval t0 which coincides with a de-energization of valve 28B and thereby closes the respective port 1. The de-energization of valve 28B thereby ceases the flow of plasma gas to the torch and results in an immediate decrease of pressure and flow rate through the nozzle as seen in reference to FIG. 3.

Figure 3:
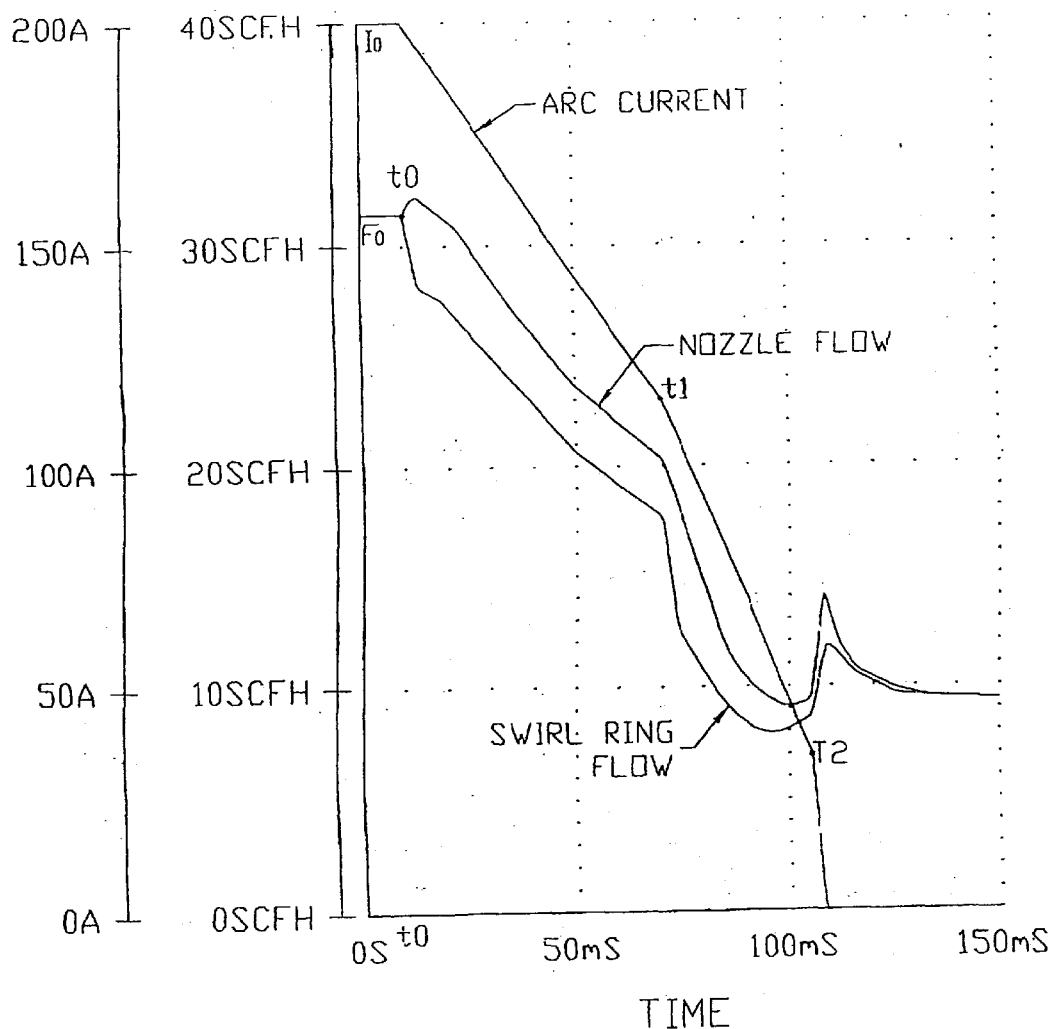

As further set forth in FIG. 3, between intervals t0 and t1, the arc current is decreased from 200 amps to 115 amps, reducing by about four-fold the heat load on the electrode. Simultaneously, the plasma arc diameter begins to decrease, thereby exposing the molten electrode element material to the plasma gas. In accordance with this invention, it has been found that the inclusion of the aluminum jacket 51 surrounding the electrode has been found to largely eliminate the formation of oxides on the electrode which would otherwise occur. The aluminum jacket can have a wall thickness of between 0.002 and 0.02 inches, and preferably about 0.004 inches.

While not wishing to be limited by theory, it is believed that the aluminum jacket 51 may actually melt and combine with the electrode element during operation of the torch. For instance, a hafnium electrode normally has a uniform, dark gray coloration. Under operating conditions when oxides form, a white marbling effect occurs which is attributed to the formation of an oxide. Upon inclusion of the aluminum jacket in association with the electrode element, the resulting electrode material assumes a grayish color which is distinctive from the initial hafnium material and distinctly different in appearance from previously observed oxides.

The electrode element/aluminum electrode combination is still conductive and retains the useful properties of the hafnium and has the additional attributes of preventing the loss of efficiency associated with oxide formation on the electrode element. It is possible that the aluminum jacket eliminates the formation of oxidation products or, alternatively, the aluminum combines with the oxide to form yet another product which avoids the detrimental effects of the oxide. Irrespective of which, if any, of the above processes is occurring, the combination of the aluminum jacket with the electrode element achieves significant advantages in extending the electrode life.

In accordance with this invention, it is believed than an improved electrode and electrode element may be provided for plasma arc torches. Such an electrode may be provided by an alloy of aluminum and hafnium or an alloy of aluminum and zirconium. To the extent the present invention produces an electrode which comprises a molten mixture of aluminum and hafnium, similar electrodes may be prepared and marketed for use in plasma arc torches. The relative amounts of aluminum or aluminum containing metals in combination with the zirconium or hafnium material may be readily determined by routine experimentation in which the resulting electrode life is monitored for various combinations of material.

At interval t1, valve 28C is also energized which connects the pressurized post-flow, through orifice 53 of a flow restrictor 55 to the plasma torch inlet. The diameter or orifice 53 should be selected in combination with the gas flow equipment and selected pressures so as to provide the desired post-flow pressure value. One having ordinary skill in the art is able to provide an appropriate flow restrictor and orifice therethrough so as to achieve the desired post-flow gas pressure needed for any individual torch.

The post-flow pressure is maintained at a lesser pressure value than the plasma flow pressure. In the example set forth in FIG. 3, a post-flow operating pressure of about 6 pounds per square inch has been found useful. The 6 pounds of pressure is less than the pressure associated with the operating nozzle flow. As a result, the pressurized post-flow serves as a vent-like sink and helps maintain the correspondence between gas flow and arc current during the shut down sequence. By interval t2, the post-flow pressure is sufficiently greater than the plasma gas pressure such that the post-flow direction is now toward the rear of the torch and provides for nozzle flow rate of about 30% of the cutting flow rate at the time the arc current is shut off.

At interval t2, the arc current is shut off. The t2 interval should be selected at a point where the current is still sufficient to maintain a transferred arc. At the same time, the swirl flow should be high enough to maintain a stable arc while the nozzle pressure and post-flow pressures are sufficiently low to avoid a damaging level of gas flow overshoot when the arc is extinguished. It has been found useful to maintain a post-flow gas flow rate at interval t2 which is about 30% of the cutting plasma flow rate. As seen in reference to FIG. 2, the post-flow continues past interval t2 when the arc is extinguished. The resulting decrease in gas flow at the time the arc extinguishes has been found to greatly extend the electrode life.

The gas flow apparatus and process set forth above provides for a smooth transition of gas flow and gas pressures when the arc is extinguished. The gas flow apparatus serves as both a pressurized sink to reduce the torch plasma pressure and also provides a gas supply source prior to interval t2. After the current is reduced to 115 amps, the post-flow valve is actuated and pressure within the torch is allowed to equalize to the post-flow pressure. This results in the rapid decrease in the swirling and plasma flow gas pressures. After the pressures have equilibrated, the post-flow no longer operates as a sink but becomes a source, providing the swirl and post-flow pressures. The change over from a gas sink to a gas source occurs about mid-way between intervals t1 and t2. The change over eliminates any pressure disturbances normally associated with a valve controlled gas flow.

The above shut down protocol and sequence has been found particularly useful for plasma arc torches operating at currents of 100 amps or greater. In particular, the present invention has been found to maintain a good correspondence between gas flow and arc current during both start up and shut down sequences. As such, the formation of oxides on the electrode is significantly reduced. During the shut down protocols, the erosion of the electrode and the formation of oxides on the electrode are reduced by maintaining an adequate swirling gas flow at the time current is cut off. Further, the post-flow gas characteristics are designed to prevent flow overshoot at current cut off, thereby minimizing damage to the electrode. In addition, the shut down protocol reduces the electrode temperature prior to arc current cut off, again minimizing the electrode erosion and electrode oxidation. Additional improvement is realized by use of the sink-source post-flow characteristics of the invention which minimizes the shut down processing time. By shortening the time required for the shut down protocol, erosion of the electrode element caused by premature arc current loss is eliminated.

The present invention describes a shut down protocol in which the current and the gas flow rate are sloped down in a continuous and corresponding manner. However, it is understood that similar improvements may be obtained by stepping down the current to a lower level such as 20 amps and running the torch for a brief interval while the torch cools down. Following cool down, the arc current may be shut off.

It should be appreciated by those skilled in the art that there are a number of variations and modifications that may be made in the shut down process according to the present invention. For example, a number of post flow and no post-flow shutdown methods may be utilized as the first and second shutdown modes according to the invention. It is intended that the present invention include such modifications and variations as come within the scope and spirit of the appended claims and their equivalents.

What is claimed:

1. A process for operating a plasma torch on shut down, the plasma torch having a plasma gas chamber supplied with a plasma gas, an electrode supplied with current for generating a plasma cutting arc by ionization of the plasma gas, and a nozzle disposed in front of the electrode through which the plasma cuffing arc extends to a workpiece, in an operational cutting mode of the torch the plasma gas within the plasma gas chamber having a swirl component imparted thereto by a swirl ring, said process comprising:

provilding an aluminum jacket surrounding the sidewalls of an electrode element;

decreasing the arc current to the electrode from Io to a lesser intermediate value during a time interval from t0 to t2, thereby lowering the temperature of the electrode element;

decreasing the nozzle flow rate from t0 to t2 in a substantially proportional correlation to said decreasing arc current; and, shutting off current to the electrode at about t2.

2. The process according to claim 1 wherein said step of decreasing the nozzle flow further comprises reducing to about zero a supply pressure of the plasma gas.

3. The process according to claim 1 wherein said step of decreasing the nozzle flow rate further comprises the steps of:

removing the plasma gas source by closing the plasma gas supply valve; and, operatively supplying a post-flow gas source at t1, said post-flow gas source in communication with said plasma gas chamber, said post-flow gas source having a pressure less than an initial pressure within said plasma gas chamber and thereby providing a pressure sink for plasma gas contained within the plasma gas chamber.

4. The process according to claim 3 wherein following the step of providing a plasma gas sink, said post-flow pressure reaches an equilibrium with a pressure within said torch chamber.

5. The process according to claim 4 wherein said post-flow gas provides a source for said nozzle flow gas.

6. The process according to claim 5 wherein said post-flow gas rate at t2 is about 30% of said operating flow rate Fo.

7. The process according to claim 6 wherein said post-flow gas is supplied at a pressure of between about 2 psi to about 10 psi.

8. The process according to claim 6 wherein said post-flow gas is supplied at a pressure of about 6 psi.

9. The process according to claim 4 wherein said supply of post-flow gas continues past the electrode subsequent to the step of shutting off the current to the electrode.

10. A process for operating a plasma torch on shut down, the plasma torch having a plasma gas chamber supplied with a plasma gas, an electrode having an aluminum jacket therearound and supplied with current for generating a plasma cutting arc by ionization of the plasma gas, and a nozzle disposed in front of the electrode through which the plasma cutting arc extends to a workpiece, in an operational cutting mode of the torch the plasma gas within the plasma gas chamber having a swirl component imparted thereto by a swirl ring, said process comprising:

decreasing an arc current to the electrode from a value at Io to a lesser intermediate value;

decreasing proportionally a nozzle flow rate relative to said decrease in the arc current; and, terminating said current to said electrode.

11. A process for operating a plasma torch on shut down, the plasma torch having a plasma gas chamber supplied with a plasma gas, an electrode supplied with current for generating a plasma cutting arc, the electrode having a sidewall in contact with an aluminum band, and a nozzle disposed adjacent the electrode through which the plasma cutting arc extends to a workpiece, in an operational cutting mode of the torch the plasma gas within the plasma gas chamber having a swirl plasma gas within the plasma chamber, said process comprising:

providing an aluminum jacket surrounding the sidewalls of an electrode element;

decreasing the current to the electrode from Io to a lesser intermediate value during a time interval from t0 to t2, thereby lowering the temperature of the electrode element;

decreasing the nozzle flow rate from t0 to t2, said decreasing including closing the plasma gas supply valve and supplying a post-flow gas source at t1, said post-flow gas in communication with said plasma gas chamber, said post-flow gas having a pressure less than a pressure within said plasma gas chamber and thereby providing a pressure sink for plasma gas contained within the plasma gas chamber; and, shutting off current to the electrode at about t2.

12. The process according to claim 11 wherein following the step of providing a plasma gas sink, said post-flow pressure reaches an equilibrium with a pressure within said torch chamber.

13. The process according to claim 12 wherein said post-flow gas provides a source for said nozzle flow gas.

14. The process according to claim 13 wherein said post-flow gas rate at t2 is about 30% of said operating flow rate Fo.

15. The process according to claim 14 wherein said post-flow gas is supplied at a pressure of between about 2 psi to about 10 psi.

16. The process according to claim 14 wherein said post-flow gas is supplied at a pressure of about 6 psi.

17. The process according to claim 12 wherein said supply of post-flow gas continues past the electrode subsequent to the step of shutting off the current to the electrode.

* * * * *